United States Patent
Donohue et al.

(10) Patent No.: US 12,195,937 B2
(45) Date of Patent: *Jan. 14, 2025

(54) DYNAMICALLY DEPLOYABLE LOW-VISIBILITY PNEUMATIC COFFERDAM SYSTEM, METHOD AND APPARATUS

(71) Applicant: George Mason University, Fairfax, VA (US)

(72) Inventors: George Lee Donohue, Churchton, MD (US); Adel N. Youssef, Fairfax, VA (US); Lucciana Hind Remy, Manassas Park, VA (US); Faris Khaled Masri, Vienna, VA (US); Murat Gokturk, Annandale, VA (US)

(73) Assignee: George Mason University, Fairfax, VA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/702,194

(22) Filed: Mar. 23, 2022

(65) Prior Publication Data
US 2022/0213662 A1 Jul. 7, 2022

Related U.S. Application Data

(63) Continuation of application No. 17/230,770, filed on Apr. 14, 2021, now Pat. No. 11,313,097.
(Continued)

(51) Int. Cl.
*E02B 3/16* (2006.01)
*E02D 19/04* (2006.01)

(52) U.S. Cl.
CPC ............... *E02D 19/04* (2013.01); *E02B 3/16* (2013.01)

(58) Field of Classification Search
CPC . E02D 19/04; E02B 3/16; E02B 3/102; E02B 3/104; E02B 7/26; E04H 9/145
See application file for complete search history.

(56) References Cited

U.S. PATENT DOCUMENTS

| | | | | |
|---|---|---|---|---|
| 4,650,368 A | * | 3/1987 | Bayer | ..................... E02B 3/127 |
| | | | | 405/116 |
| 4,983,077 A | * | 1/1991 | Sorge | ........................ E04G 9/10 |
| | | | | 405/303 |

(Continued)

OTHER PUBLICATIONS

Kumpikaite et al. "Interrelation Between Tensile Properties of Yarns and Woven Fabrics with these Yarns"; All; Dec. 2019 (Year: 2019).*
(Continued)

*Primary Examiner* — Benjamin F Fiorello
(74) *Attorney, Agent, or Firm* — Carter, DeLuca & Farrell LLP; George Likourezos

(57) ABSTRACT

A dynamically deployable, low visibility pneumatic cofferdam for flood mitigation is disclosed. The cofferdam includes a first planar component, a second planar component, an inflatable hermetic airbag sandwiched therebetween, and connection members attached to the first planar component, a second planar component to form a cofferdam unit. The connection members are adjustable to apply and maintain a desired amount of pressure on the airbag to enable a watertight seal to be formed. The cofferdam units may be sized and designed to sealingly mate adjacent cofferdam units in a variety of configurations to form watertight seals. The cofferdam units may also be sized and designed to attach to seawalls, flood walls, sidewalks, or other infrastructure. When in a deployed state, the height of the cofferdam may be adjusted to a desired height to provide flood mitigation. When in an undeployed state, the cofferdam remains in a substantially flat and unobtrusive position.

20 Claims, 11 Drawing Sheets

Related U.S. Application Data

(60) Provisional application No. 63/010,263, filed on Apr. 15, 2020.

(56) References Cited

U.S. PATENT DOCUMENTS

| | | | | |
|---|---|---|---|---|
| 5,857,806 A * | 1/1999 | Melin | ............... | E02B 3/108 |
| | | | | 405/91 |
| 7,232,103 B2 * | 6/2007 | Heath | ............... | E21D 15/483 |
| | | | | 52/2.21 |
| 8,727,670 B2 * | 5/2014 | Roelofs | ............... | E21F 17/107 |
| | | | | 405/289 |
| 9,334,735 B2 * | 5/2016 | Killassy | ............... | E21D 15/483 |

OTHER PUBLICATIONS

Hu et al. "Polyamide and Polyester Fibers"; All; 2000 (Year: 2000).*

* cited by examiner

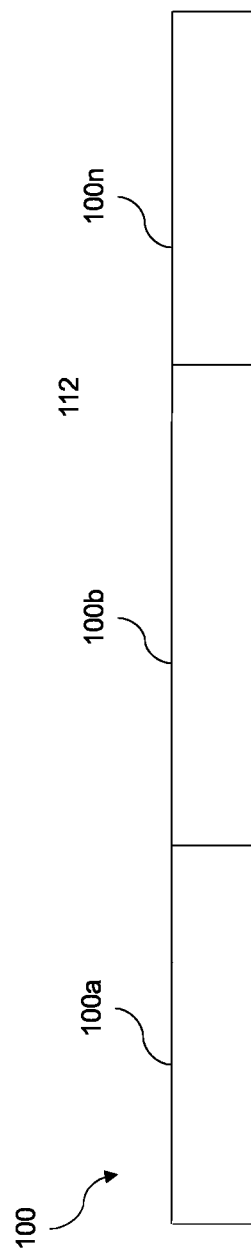

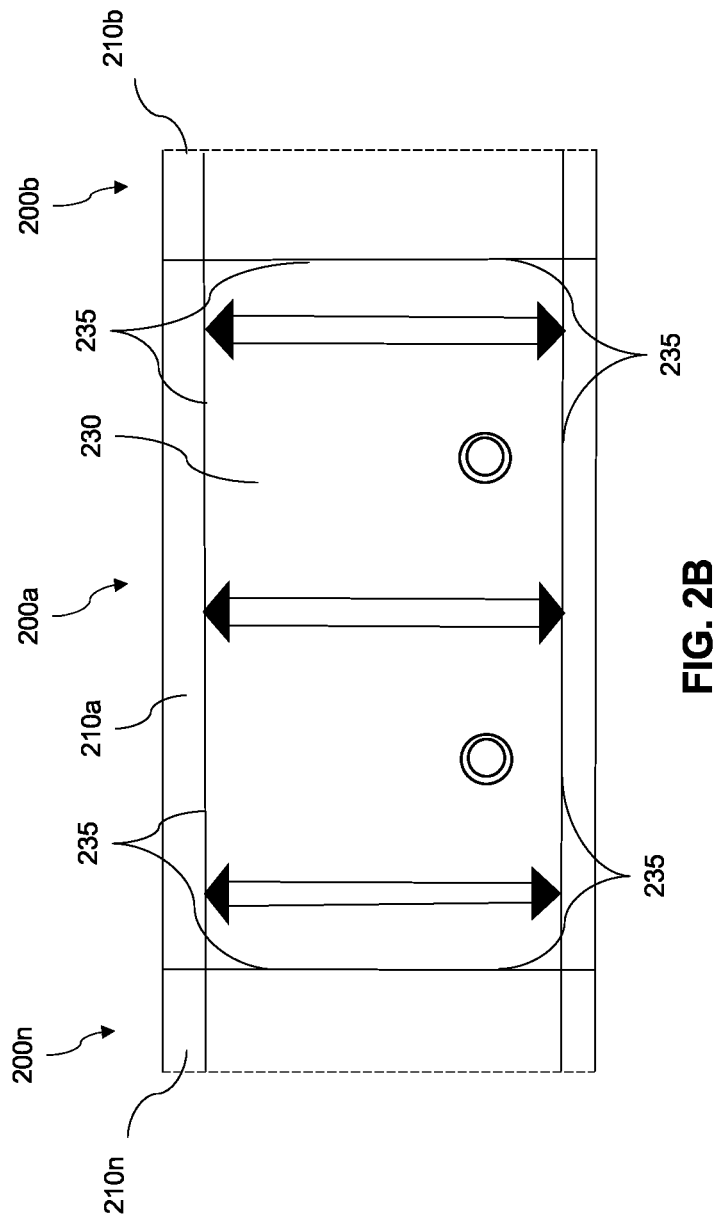

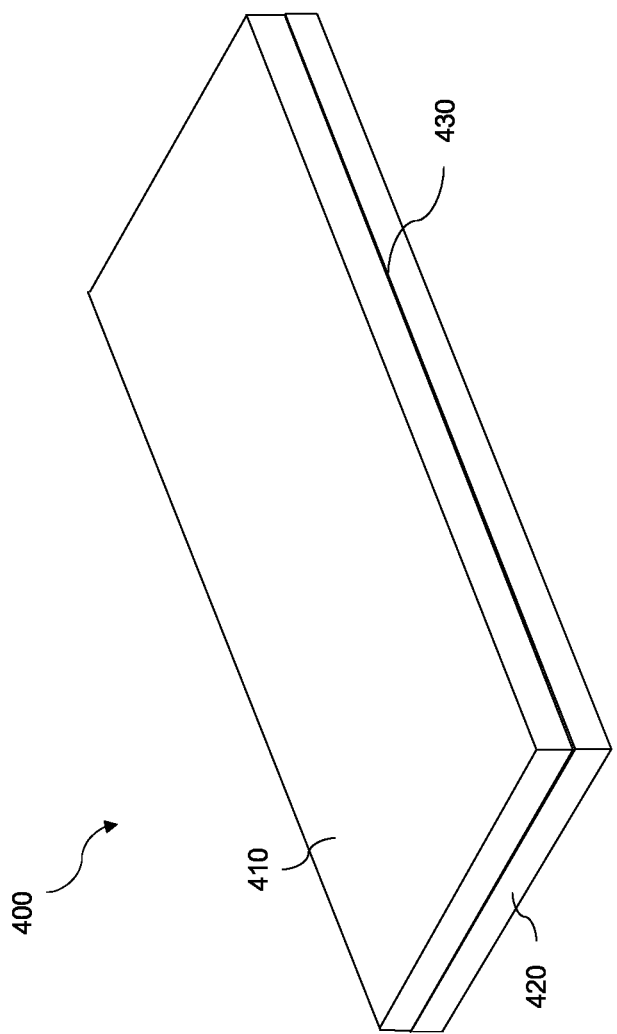

DYNAMICALLY DEPLOYABLE LOW-VISIBILITY PNEUMATIC COFFERDAM SYSTEM, METHOD AND APPARATUS

CROSS-REFERENCE TO RELATED APPLICATIONS

The present application is a continuation of U.S. patent application Ser. No. 17/230,770 (filed on Apr. 14, 2021), which itself claims the benefit of U.S. Provisional Patent Application Ser. No. 63/010,263 (filed on Apr. 15, 2020), which are each hereby incorporated by reference in their respective entireties.

TECHNICAL FIELD

Embodiments of the present disclosure relate generally to pneumatic cofferdams. More particularly, embodiments relate to a dynamically deployable, low visibility pneumatic cofferdam for flood mitigation and prevention.

BACKGROUND

Relative sea levels have increased by about 2-5 mm per year over the last several decades due to global warming. This pattern has resulted in a global increase of land surface temperature, the melting of glacial ice masses, and thermal expansion. As a result, events that normally would not cause nuisance flooding (e.g., storm surges, heavy winds, tides and heavy rains) increasingly present the risk of causing flooding events that pass over the nuisance flooding threshold limit.

Further, rising sea levels bring many low-lying areas of land under increased threat of water damage due to flooding. These low-lying areas often include populated areas such as coastal cities, towns and associated infrastructure, thereby exposing those areas to flood vulnerabilities. Coastal communities across the United States and throughout the world are experiencing a significant rise in nuisance flooding events. Some estimates suggest a two hundred percent (200%) increase over the next two decades. These flooding events create negative financial impacts on community members, and are expected to increase greatly in frequency over the next two decades. In addition, businesses in these communities are experiencing an increase in store closures and property damage while losing consumer visits due to these flooding events. Homeowners in these communities are also experiencing an increase in property and asset damages associated with flooding. At the same time, communities experiencing flooding are seeing a decline in tourism and are at risk of permanently damaging existing buildings and infrastructure (e.g., roads, bridges, utilities, storm surge walls or seawalls, and other public infrastructure), some of which was designed and built to address flooding at a current threshold level. Insurance funds to repair such damage are under considerable stress. City storm drain pumping stations present one way to remediate this problem. However, when a seawall is below the storm surge level, the pumping stations simply cycle the water back into the saturated system, resulting in an ineffective solution.

Cofferdams may be used to provide temporary barriers for blocking water when construction projects or other activities are adjacent to or within bodies of waters, such as ponds, lakes, streams, oceans, run-off, flooded regions and similar venues where water interferes with the project or activity. Cofferdams prevent water from entering work zones on or near bodies of water, such as where excavation, concrete pouring, drilling, or other tasks are being conducted. Cofferdams typically function by restraining water and permitting a relatively dry area for construction projects and other activities because water does not enter the work zone or area that is protected by the barrier of the cofferdam. Cofferdams may also be used as diversion barrier controls that include water exclusion enclosures adjacent to river banks, within a river or lake, or water exclusion areas that have been dewatered by damming an upstream channel and creating a bypass ditch or pipe to deliver the diverted flow downstream beyond the work area (e.g., pipe trench location). Diversion barrier controls also prevent work zone sediment from entering the water system. Further, many existing temporary cofferdams are difficult to store and are not suitable to erect as storms change course and intensity at an increasing rate.

Permanent or temporary cofferdams may offer one solution to deal with water levels that are above a current seawall height. Another conventional approach for flood mitigation is a self-closing flood barrier (SCFB). The SCFB is a floating entrenching wall that remains recessed in-ground during normal non-flood conditions. However, many communities find permanently installed higher seawalls as obstructive, unsightly and aesthetically undesirable. Similarly, SCFBs are also often found to be unsightly and aesthetically undesirable. These systems are also very expensive, difficult to assemble and deploy, are built to only be deployed temporarily, and require a large amount of space to store when not being used. There remains considerable room for improvement.

BRIEF SUMMARY

In accordance with one or more embodiments, a dynamically deployable cofferdam system includes one or more of the following: a plurality of first planar components forming resilient upper cofferdam members that are moveable between an undeployed position and a deployed position; a plurality of second planar components forming resilient lower cofferdam members; a plurality of inflatable hermetic bag members, defining internal chambers to receive a volume of air, disposed between the upper cofferdam members and the lower cofferdam members; a plurality of connection members to form an attachment between the upper cofferdam members and the lower cofferdam members and facilitate formation of a watertight seal between the inflatable hermetic bag, the upper cofferdam members, and the lower cofferdam members through an application of pressure from the upper cofferdam members and the lower cofferdam members to the inflatable hermetic bag member; and one or more pumps serving as air sources to inflate the inflatable hermetic bag members to a desired pressure, wherein the plurality of connection members facilitate movement of the upper cofferdam members from the undeployed position to the deployed position at a desired height to form a flood mitigation barrier.

In accordance with one or more embodiments, a dynamically deployable cofferdam apparatus includes one or more of the following: a first planar component forming a resilient upper cofferdam member that is moveable between an undeployed position and a deployed position; a second planar component forming a resilient lower cofferdam member; an inflatable hermetic bag member, defining an internal chamber to receive a volume of air, disposed between the upper cofferdam member and the lower cofferdam member; and a plurality of connection members to form an attachment between the upper cofferdam member and the lower cofferdam member and facilitate formation of a watertight seal between the inflatable hermetic bag, the upper cofferdam members, and the lower cofferdam members through an application of pressure from the upper cofferdam members and the lower cofferdam members to the inflatable hermetic bag member, wherein the plurality of connection members facilitate movement of the upper cofferdam member from the undeployed position to the deployed position at a desired height to form a flood mitigation barrier.

In accordance with one or more embodiments, a method of manufacturing a flood mitigation barrier includes one or more of the following: arranging an inflatable hermetic bag member, defining an internal chamber to receive a volume of air, between a first planar component forming a resilient upper cofferdam member and a second planar component forming a resilient lower cofferdam member; attaching, via a plurality of connection members, the upper cofferdam member and the lower cofferdam member to facilitate formation of a watertight seal between the inflatable hermetic bag, the upper cofferdam members, and the lower cofferdam members through an application of pressure from the upper cofferdam members and the lower cofferdam members to the inflatable hermetic bag member; and inflating, via one or more pumps as air sources, the inflatable hermetic airbag to a desired pressure such that the upper cofferdam member is moved from an undeployed position to a deployed position at a desired height.

BRIEF DESCRIPTION OF THE DRAWINGS

The various advantages of the one or more embodiments will become apparent to one skilled in the art by reading the following specification and appended claims, and by referencing the following drawings, in which:

FIG. 1A illustrates a dynamically deployable cofferdam system forming an elongated wall structure serving as a flood mitigation barrier in accordance with one or more embodiments;

FIGS. 2A and 2B illustrate detailed views of a dynamically deployable cofferdam unit for use in a cofferdam system in accordance with one or more embodiments;

FIGS. 4A and 4B illustrate examples of a dynamically deployable cofferdam unit during deployment in accordance with one or more embodiments;

DESCRIPTION OF EMBODIMENTS

The present disclosure will now be described more fully hereinafter. This disclosure may, however, be embodied in many different forms and should not be construed as being limited to the specific embodiments set forth herein. Rather, these embodiments are provided so that this disclosure will be thorough and complete, and will fully convey the scope to those skilled in the art.

Figure 1B:
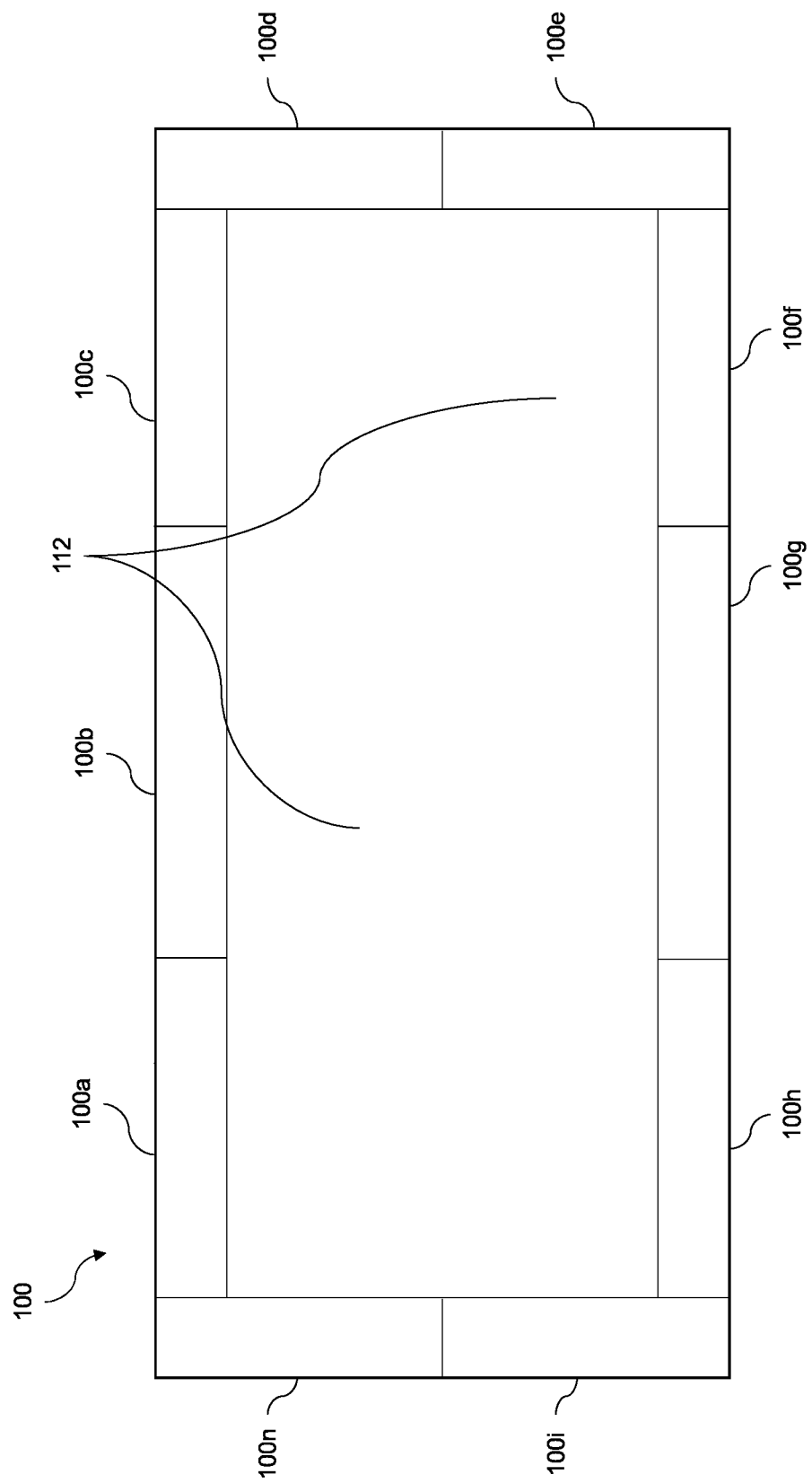
FIG. 1B illustrates a dynamically deployable cofferdam system forming an enclosed wall structure serving as a flood mitigation barrier in accordance with one or more embodiments.

Turning now to FIGS. 1A and 1B, an overview of a dynamically deployable cofferdam system 100 is shown. The dynamically deployable cofferdam system 100 includes a plurality of dynamically deployable cofferdam units 100a-n. FIG. 1A, for example, depicts a plurality of cofferdam units 100a-n arranged end-to-end and substantially in a line to form an elongated wall. FIG. 1B, on the other hand, depicts a plurality of cofferdam units 100-a-n arranged end-to-end and at angles with respect to each other to form a fully enclosed barrier that provides a protected area 112 against flooding. These arrangements are suitable for arranging and anchoring along and/or around a perimeter of a location to be protected from flooding thereby creating a barrier of flood protection that can be instantly deployed in the event of an expected or imminent flood. The cofferdam units 100a-n may be attached, for example, to a structure such as a sidewalk, surge wall, seawall, or other infrastructure. Upon deployment, the cofferdam units 110a-n may be deployed from a substantially flat position (i.e., a position substantially similar to the existing infrastructure) to a deployed position (i.e., a position that provides supplemental height to the existing infrastructure) to thereby provide an increased level of protect against flooding. In at least one embodiment, the cofferdam units 110a-n use an air pump (not shown here) to inflate an airbag (not shown here) with sufficient pressure to raise the height of the airbag and associated components to protect an area from most nuisance flooding events, with the airbag acting as a barrier or protection component. In at least one embodiment, the system 100 is designed to remain anchored in an undeployed (i.e., substantially flat position) along or around a perimeter of a location. The system 100 thereby allows for usable space (e.g., a sidewalk, seawall top, surge wall top, and the like) when not deployed. As a result, the system 100 may substantially reduce or eliminate the need or deployment labor and storage, while also allowing for constant availability in the event of a flood.

Figure 2A:
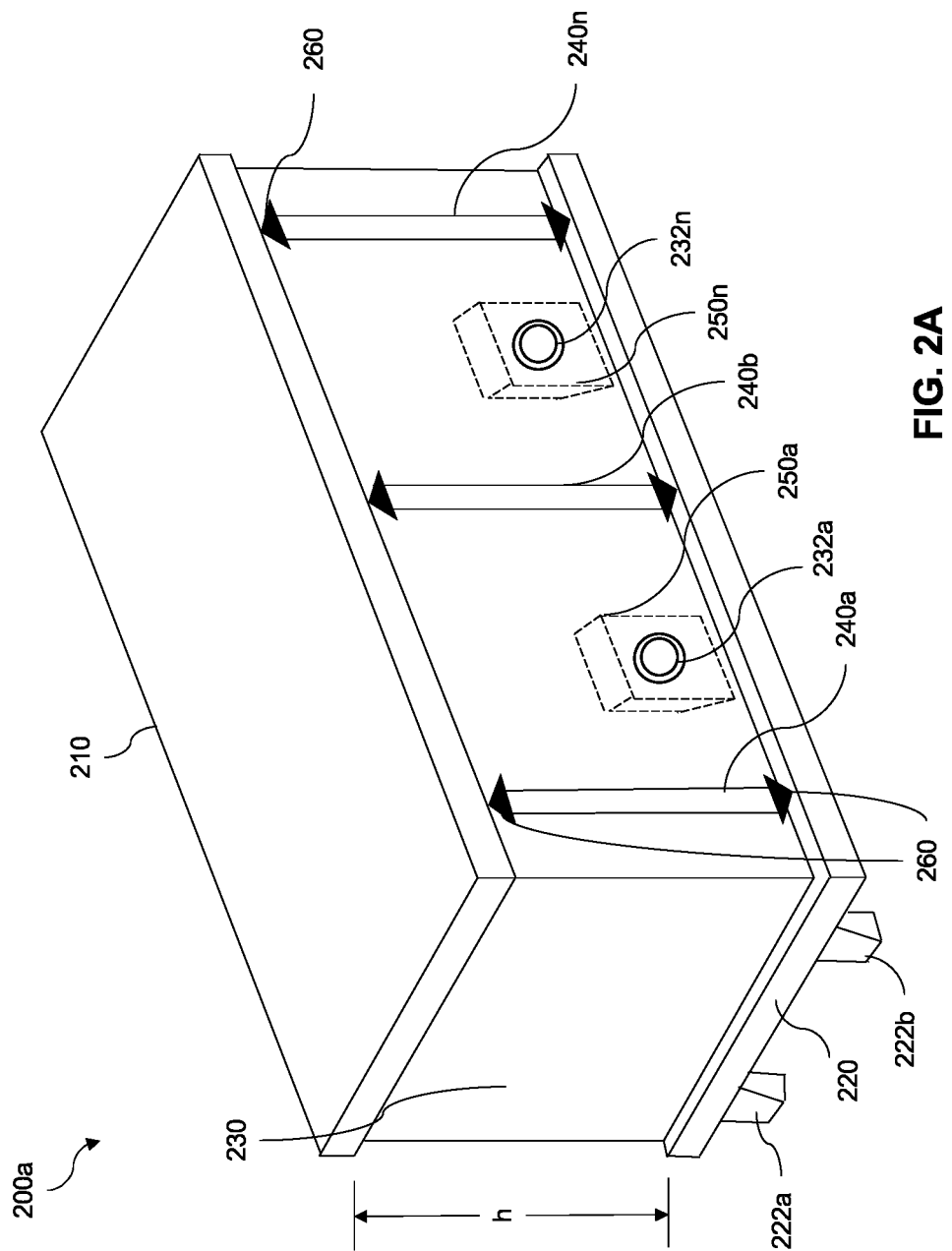

FIGS. 2A and 2B provide more detailed views of an example of a dynamically deployable cofferdam unit 200. FIG. 2A illustrates a plan view of FIG. 2B illustrates a side view of cofferdam unit 200a. The illustrated cofferdam unit 200a may be readily substituted for cofferdam units 100a-n in cofferdam system 100, as discussed above with respect to FIG. 1. In the illustrated examples, the cofferdam unit 200a has a substantially rectangular shape and includes a first planar component 210 that forms a resilient top or upper cofferdam member, a second planar component 220 that forms a resilient bottom or lower cofferdam member, and an inflatable hermetic bag member 230 or airbag having one or more internal chambers to receive a volume of air. In accordance with one or more embodiments, the inflatable hermetic bag member 230 includes a plurality of internal chambers each having its own valve 232a-n in order to improve reliability due to a breach of one chamber. The inflatable hermetic bag member 230 is disposed between the first planar component 210 and the second planar component 220. The first planar component 210 is moveable between an undeployed position that is substantially flat (See FIG. 4A) and a deployed position that has a selectable height dimension (See FIG. 4B).

Cofferdam unit 200a also includes a plurality of connection members 240a-n that form attachments between the first planar component 210 (i.e., upper cofferdam member) and the second planar component 220 (i.e., lower cofferdam member). The plurality of connection members 240a-n may be, for example, straps, bands, or other fasteners formed of a resilient material such as a polymer or other similar materials. Embodiments, however, are not limited thereto, and thus, this disclosure contemplates the connection members 240a-n being composed of any suitable resilient material that falls within the spirit and scope of the principles of this disclosure.

The plurality of connection members 240a-n may be selected in a number and size to maintain a sufficient amount of tension in a manner that facilitates an application of pressure to be applied and maintained by the first planar component 210 and the second planar component 220 across the contact surface or interface of the inflatable hermetic bag 230. In accordance with one or more embodiments, the plurality of connection members 240a-n should be attached to both sides of the first planar component 210 and the second planar component 220 at appropriate distances (e.g., substantially symmetrically spaced apart) in order to facilitate the application of symmetric pressure across the contact surface or interface of the inflatable hermetic bag 230. The plurality of connection members 240a-n may thereby facilitate the formation of a watertight seal at each respective contact surface or interface between the inflatable hermetic bag 230, the first planar component 210 (i.e., the upper cofferdam member), and the second planar component 220 (i.e., the lower cofferdam member) through the application of pressure therefrom.

In accordance with one or more embodiments, one or more pumps 250a-n serve as air sources to inflate the inflatable hermetic bag member 230 via one or more valves 232a to a desired pressure to thereby raise the first planar component 210 to a desired height. In accordance with one or more embodiments, the one or more pumps 250a-n may be disposed within the inflatable hermetic bag 230. Alternatively, the one or more pumps 250a-n may be separate component(s) provided by an operator during deployment of the system 100.

The plurality of connection members 240a-n may facilitate movement of the upper cofferdam member from the undeployed position to the deployed position at a desired height to form a flood mitigation barrier. In various embodiments, the length of the plurality of connection members 240a-n is adjustable to apply a desired amount of pressure across the contact surface or interface of the inflatable hermetic bag member 230 and facilitate deployment of the upper cofferdam members to the desired height. In accordance with one or more embodiments, a plurality of strap anchor members or strap anchors 260 (e.g., treated metal buckles, D-rings, or hooks)) may be used to adjustably secure the connection members 240a-n to the first planar component 210 and the second planar component 230. The strap anchors 260 may be include a hinge or serve as a hinge member. In accordance with one or more embodiments, the second planar component 220 includes one or more anchor members 222a, 222b to attach the lower cofferdam members to a base support surface such as for example, a sideway, seawall, surge barrier, and the like. The anchor members 222a, 222b may be selected and disposed in a variety of arrangements to secure the cofferdam unit 200.

As illustrated in FIG. 2B, a plurality of cofferdam units 200a-n may be joined together to form a dynamically deployable cofferdam system such as system 100 discussed hereinabove with respect to FIGS. 1A and 1B. The cofferdam units 200a-n may be modular, and thus, designed, sized, and selected as appropriate to address a particular deployment environment. As a result, the cofferdam units 200 may have a variety of shapes and sizes, and may be constructed of a range of materials depending on environmental and other requirements. In at least one embodiment, the cofferdam units 200a-n may have first planar components 210a-n (i.e., upper cofferdam members), a second planar components 220a-n (i.e., lower cofferdam members), and an inflatable hermetic bag 230 that all have substantially rectangular cross-sections that are sized to form a seal 235 along the contact interfaces with the inflatable hermetic bag 230 and along contact interfaces with corresponding components of an adjacent cofferdam member. The resulting seals 235 help to ensure that cofferdam system 200 is substantially watertight.

Figure 3:
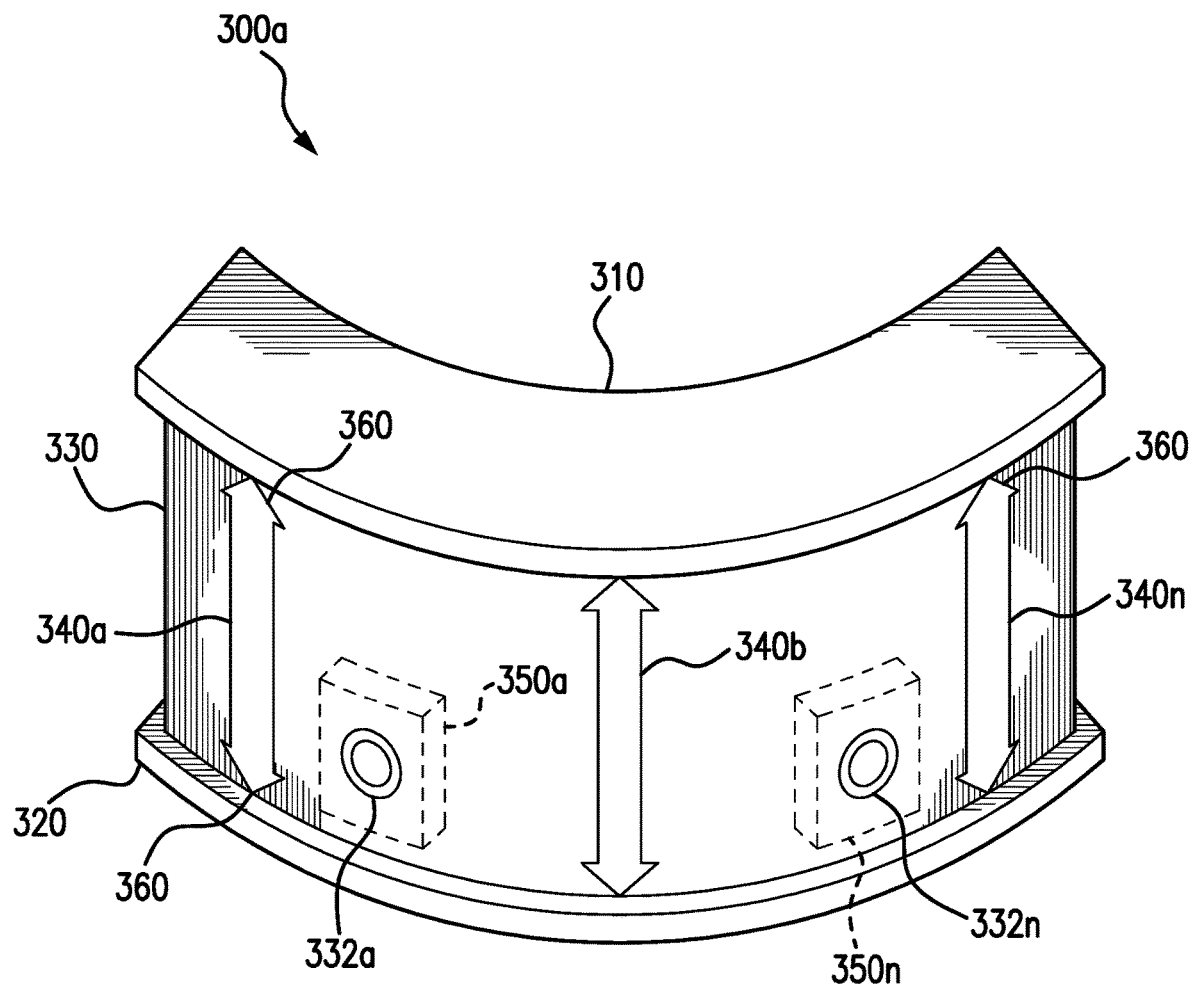
FIG. 3 illustrates a detailed view of a dynamically deployable cofferdam unit for use in a cofferdam system in accordance with one or more embodiments.

As illustrated in FIG. 3, in accordance with one or more embodiments, a cofferdam unit 300 may have a first planar component 310 (i.e., upper cofferdam member), a second planar component 320 (i.e., lower cofferdam member), and an inflatable hermetic bag 330 that all have substantially curvilinear cross-sections. As with components of cofferdam units 200a-n, the component of cofferdam unit 300 are also sized to form a seal along an interface with the inflatable hermetic bag 330 and along an interface with corresponding components of an adjacent cofferdam member. The curvilinear shape allows cofferdam unit 300 to be used in curved and contoured arrangements to provide greater deployment utility in a wide range of environments. While cofferdam units 200, 300 have been shown having components with rectangular and curvilinear cross-sections, respectively, other shapes may be employed without departing from the disclosure. For example, cofferdam units having components with substantially triangular, trapezoidal, and other similar cross-sectional shapes may used for form at least a part of a cofferdam system based on design and/or environmental requirements.

In accordance with one or more embodiments, the dynamically deployable cofferdam system, such as cofferdam system 100, may be deployed to be permanently installed as a sidewalk, sidewall, sea wall, or surge wall overlaying system that retains the inflatable hermetic bag 230 under a walkway (e.g., an aluminum walkway). In at least one embodiment, the components may be dimensioned as approximately a four (4) foot wide by one (1) foot deep by forty (40) foot (4'×1'×40') long section(s) having a walkway top. These sections may be bolted, for example, to an existing or modified concrete substrate with approximately one-quarter inch (¼") anchors on approximately three (3) one (1) foot (1') centers (or as deemed appropriate for the expected local storm surge load). The upper surface of the first planar component 210 may be designed, for example, as a four (4) foot (4') aluminum walkway, or a separate four (4) foot (4') aluminum walkway may be disposed on an upper surface of the cofferdam unit 200 or cofferdam system 100. In accordance with one or more embodiments, the dynamically deployable cofferdam system 100 provides a permanent flood mitigation solution that is readily available when needed and has a low visual impact when not in use.

The cofferdam units 200 disclosed herein may be made of a variety of suitable materials. With respect to cofferdam unit 200, for example, the first planar member 210 and the second planar member 220 may be made of durable, weather resistant, and low maintenance materials such as treated Brazilian Ipe wood, galvanized steel, stainless steel or aluminum. The inflatable hermetic bag 230 may be made of flexible PVC (polyvinyl chloride) or Hypalon® coated fabric that is particularly durable, resistant to abrasion, puncture, and deterioration. The one or more pumps 250a-n used in the cofferdam units 200 may be commercial grade, low-pressure air pumps enclosed in watertight compartments and connected to each valve 232a-n. In order to achieve rapid deployment of the recommended or desired dimensions in a desired or optimal period of time, such as approximately 12 minutes or less, an air pump of 10 or higher CFM airflow level may be used. The electrical load of a 120V circuit with all the air pumps 150a-n connected in parallel will be equal to 10 watts/linear feet. Electric current is calculated to be equal to 0.08 amperes per linear foot (0.08 A/LF) of the pneumatic cofferdam.

The pressure of air provided by the one or more pumps 250a-n to the inflatable hermetic bag member 230, as discussed above, must be strong enough to effectively repel the force of water due to a flooding event. The force of the inflatable hermetic bag member 230 acts outward in all directions against opposing forces in contact with it, effectively acting against the water from the horizontal direction and the cofferdam top material and the force of the plurality of connection members (e.g., straps) acting downwards in the vertical direction. For example, in a 40 foot (40') long system, the force of water with respect to the height of the cofferdam system has been determined to have a minimum force value equal to 1249 lbs. (approximately 0.2 psi), and a maximum force value equal to 79,928 lbs. (approximately 1.7 psi), ranging from 1 foot to 8 feet of water height. For a cofferdam unit of 10 linear feet (10 LF) (i.e., 4' width & 6' height), the force of inflatable hermetic bag member 230 is calculated to be approximately 30,000 lbs. and the pressure in the bag member is calculated to be approximately 7 psi. The tension of each connecting member 240a-n (i.e., polyester strap) varies according to the material Young's modulus (1-10 gPa), change in strap length to original length (5-6 feet), and the cross-sectional area of the connecting member 240a-n. Assuming the use of polyester straps with 3 gPa Young's modulus, 0.001 ft$^2$ cross sectional area and a six percent (6%) stretching percentage, the tension value ranges from approximately 1,500 to 6,000 lbs. in a deployed state with strap widths ranging from 1 inch to 4 inches (1-4 in.). System analysis measuring airbag protective force vs. water force results in a strength safety factor of almost 5 folds.

Figure 4B:
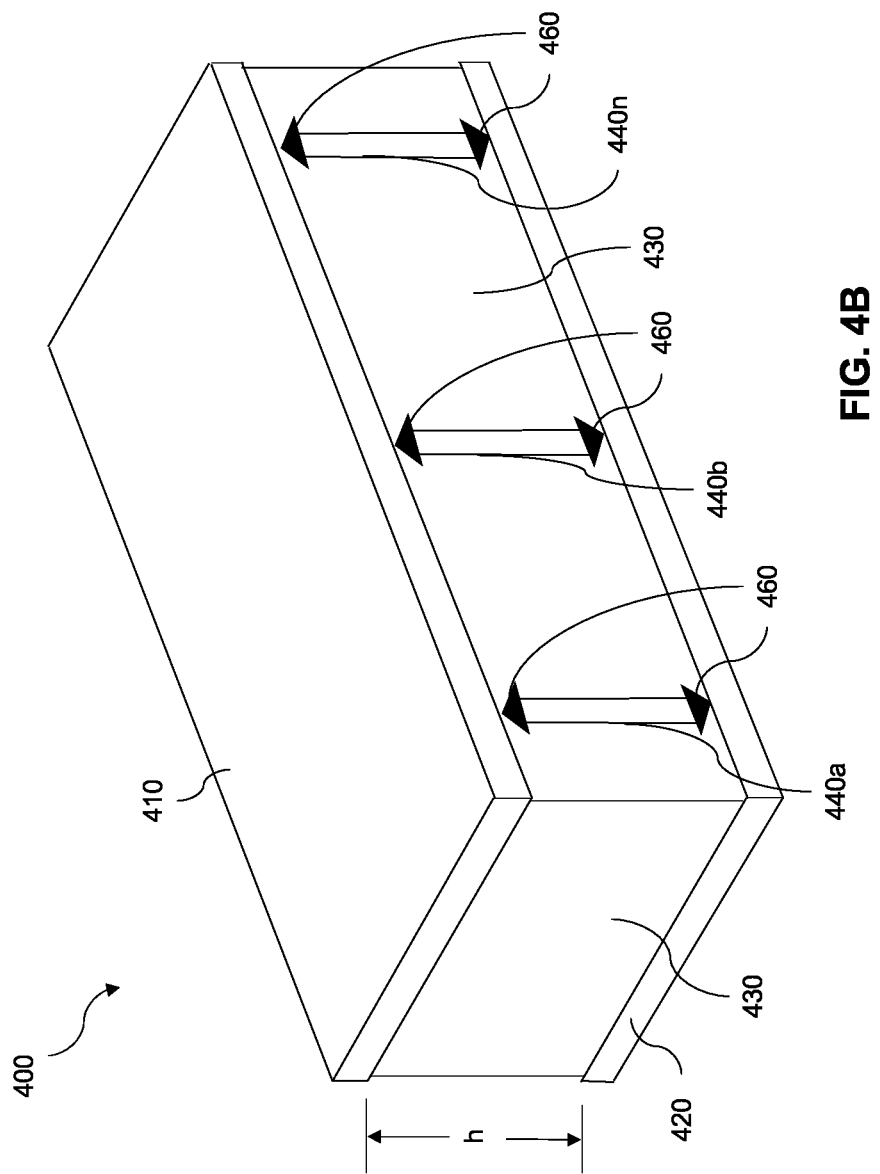

Turning now to FIGS. 4A-4B, cofferdam unit 400 is shown in undeployed (FIG. 4A) and deployed (FIG. 4B) states. Cofferdam unit 400 includes the same components as cofferdam unit 200, discussed in more detail above, and may be substituted therefor. FIG. 4A shows the cofferdam unit 400 in an undeployed state prior to the unit being unlocked and deployed. In the undeployed state, cofferdam unit 400 remains substantially flat. The first planar member 410 (i.e., cofferdam top) and the second planar member 420 (i.e., cofferdam bottom) are visible, while the inflatable hermetic bag member 430 remains disposed between the first planar member 410 and the second planer member 420 along with the other components associated with the bag member. Due to the low profile afforded by the cofferdam unit 400 while in the undeployed position, the cofferdam unit 400 substantially blends into existing infrastructure to which it is attach. The cofferdam unit 400 thereby affords unobstructed views while also providing usable space (e.g., a sidewalk, seawall top, surge wall top, and the like) when not deployed. FIG. 4B shows the cofferdam unit in a deployed state. Cofferdam unit 400 may be moved from an undeployed state to a deployed state by inflating the inflatable hermetic bag member 430 via, for example, air pumps 250a-n. Upon inflation, the first planar member 410 moves from a substantially flat position (i.e., adjacent the second planar member 420) to a desired distance or height away from the second planar member 420. The distance or height that the first planar member 410 travels or moves is determined, at least in part, by an adjustment of the plurality of connection members 440a-n. Upon the detection of an upcoming flood, the plurality of connection members 440a-n may be adjusted, for example, via the plurality of strap anchors 460, to allow the plurality of strap anchors 260 may be adjusted to allow the inflatable hermetic bag member 430 to be inflated to a sufficient height to address the condition. As a result, the cofferdam system 400 substantially reduces or eliminates the need for deployment labor and storage, while also allowing for constant availability in the event of a flood.

Figure 5:
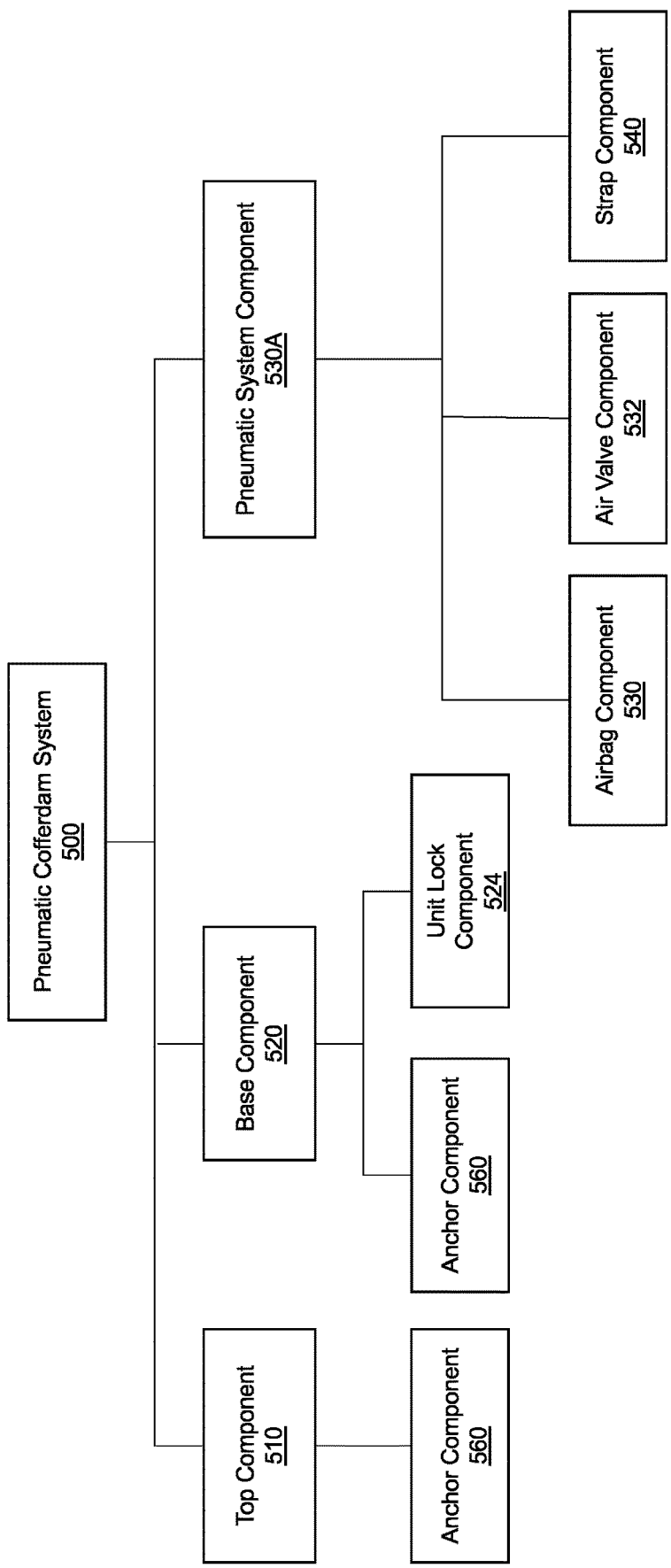
FIG. 5 is a schematic of an example of a physical architecture of a pneumatic cofferdam system in accordance with one or more embodiments.

FIG. 5 is a schematic of an example of a physical architecture of a pneumatic cofferdam system according to an embodiment. Pneumatic cofferdam system 500 has three main components including a top component 510, a base component 520 and a pneumatic system component 530A. The top component 510 may be, for example, the first planar member 210 and includes an anchor component 510 (e.g., plurality of strap anchors 260). The base component 520 may be, for example, the second player member 220 and includes an anchor component (e.g., plurality of strap anchors 260) and unit lock component 524. In accordance with one or more embodiments the plurality of connection members 240a-n and/or the plurality of anchors 260 may serve as unit lock components 524. In accordance with one or more embodiments, an operator would need to unlock these components prior to deployment of the cofferdam system. The pneumatic system component 530A may include an airbag component 530 (e.g., inflatable hermetic bag member 230), an air valve component 532 (e.g., air valves 232a-n), and a strap component 540 (e.g., plurality of connection members 240a-n). In accordance with one or more embodiments, the dynamically deployable cofferdam system 500 utilizes the various disclosed components to perform the functions described herein.

Figure 6:
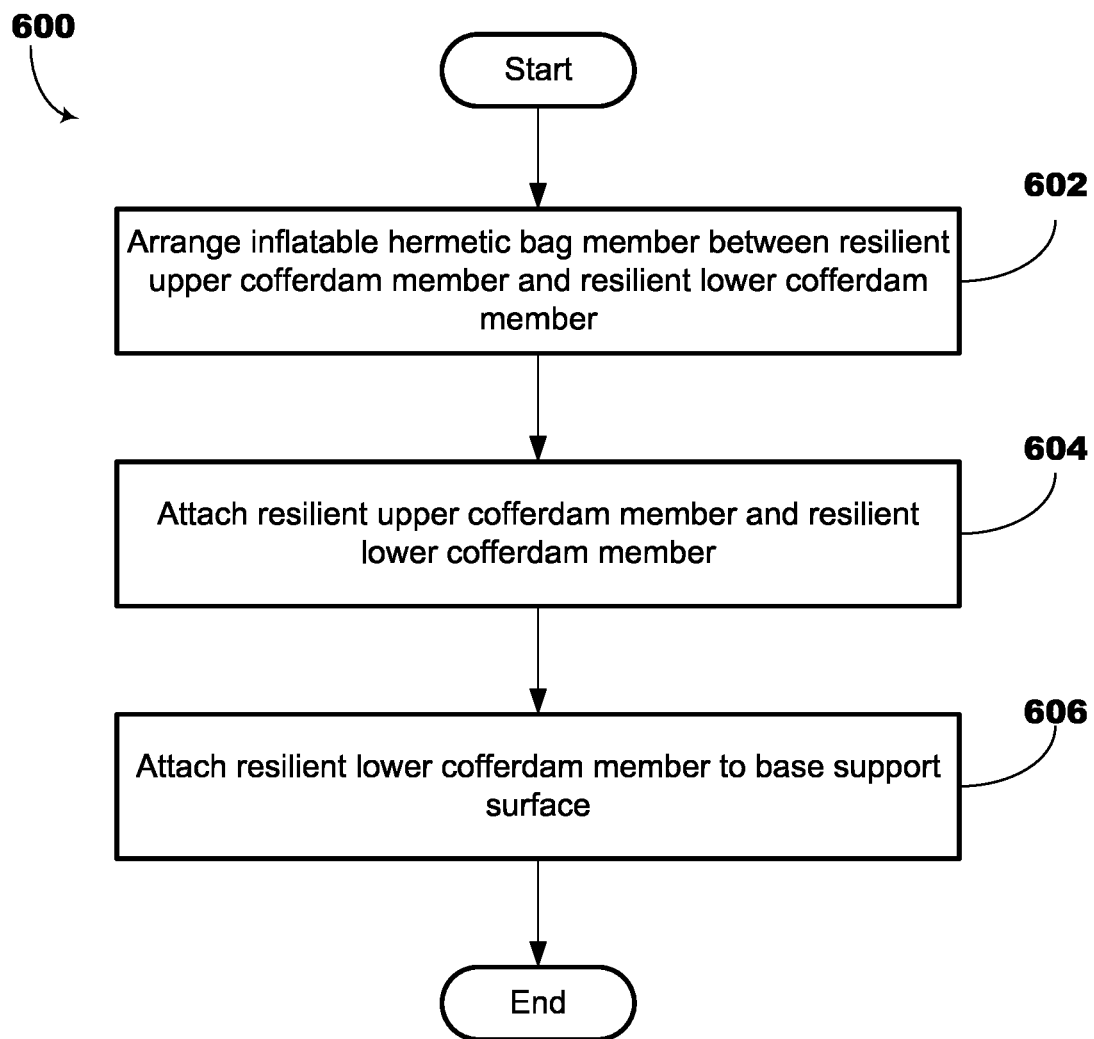
FIG. 6 is a flowchart of an example method of manufacturing a flood mitigation barrier in accordance with one or more embodiments.
Figure 7:
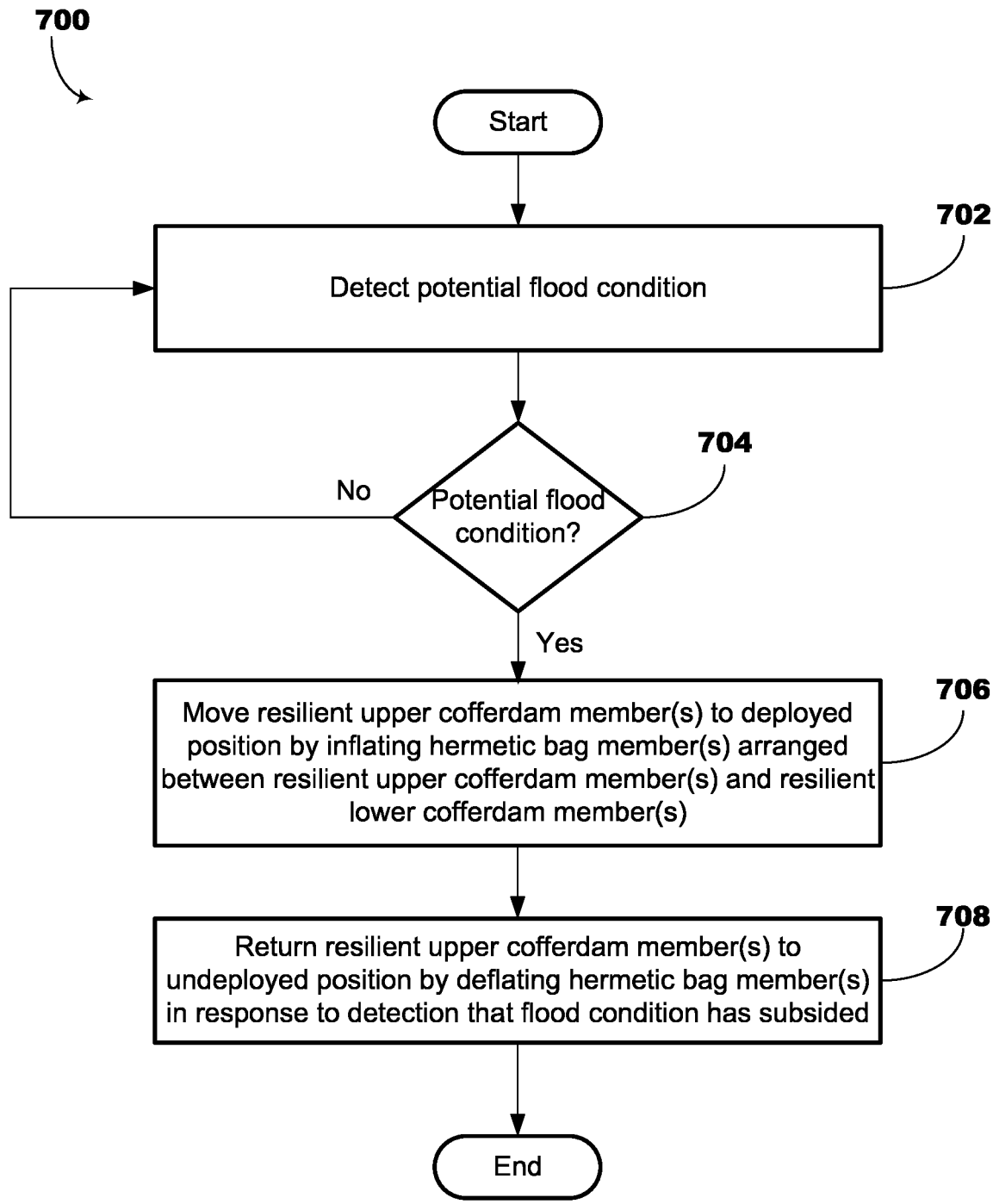
FIG. 7 is a flowchart of an example method of forming a flood mitigation barrier in accordance with one or more embodiments.

In the illustrated examples of FIGS. 6 and 7, a flowchart of a method 600 of manufacturing a flood mitigation barrier and a method 700 of forming a flood mitigation barrier are respectively provided. In one or more examples, the respective flowcharts of the methods 600 and 700 may be implemented by one or more processors 21 of the computing system disclosed herein. For example, the one or more processors 21 are configured to implement the methods 600 and 700 using logic instructions (e.g., software), configurable logic, fixed-functionality hardware logic, etc., or any combination thereof. In one or more examples, software executed by the computing system 810 provides functionality described or illustrated herein. In particular, software (e.g., stored on a non-transitory computer-readable medium)) executing by the one or more processors 820 is configured to perform one or more processing blocks of the methods 600 and 700 set forth, described, and/or illustrated herein, or provides functionality set forth, described, and/or illustrated.

In the illustrated example of FIG. 6, illustrated process block 602 includes arranging an inflatable hermetic bag member, defining an internal chamber to receive a volume of air, between a first planar component forming a resilient upper cofferdam member and a second planar component forming a resilient lower cofferdam member.

The method 600 may then proceed to illustrated process block 604, which includes attaching, via a plurality of connection members, the upper cofferdam member and the lower cofferdam member to facilitate formation of a watertight seal between the inflatable hermetic bag, the upper cofferdam members, and the lower cofferdam members through an application of pressure from the upper cofferdam members and the lower cofferdam members to the inflatable hermetic bag member.

The method 600 may then proceed to illustrated process block 606, which includes attaching the one or more resilient lower cofferdam members to a base support surface. The method 600 may terminate or end after execution of process block 606.

In the illustrated example of FIG. 7, illustrated process block 702 includes dynamically detecting a potential flood condition.

The method 700 may then proceed to illustrated process block 704, which includes determining whether a potential flood condition exists.

If "No," i.e., there is no potential flood condition, the method 700 may returns to process block 702.

If, "Yes," i.e., there is a detected potential flood condition, the method 700 may then proceed to illustrated process block 706, which includes moving one or more resilient upper cofferdam members from a undeployed position to a deployed position by inflating the one or more hermetic bag members arranged between the resilient upper cofferdam members and resilient lower cofferdam members attached thereto.

The method 700 may then proceed to illustrated process block 708, which includes returning the one or more resilient upper cofferdam members to the undeployed position by deflating the one or more hermetic bag members. The method 700 may terminate or end after execution of process block 708.

Figure 8:
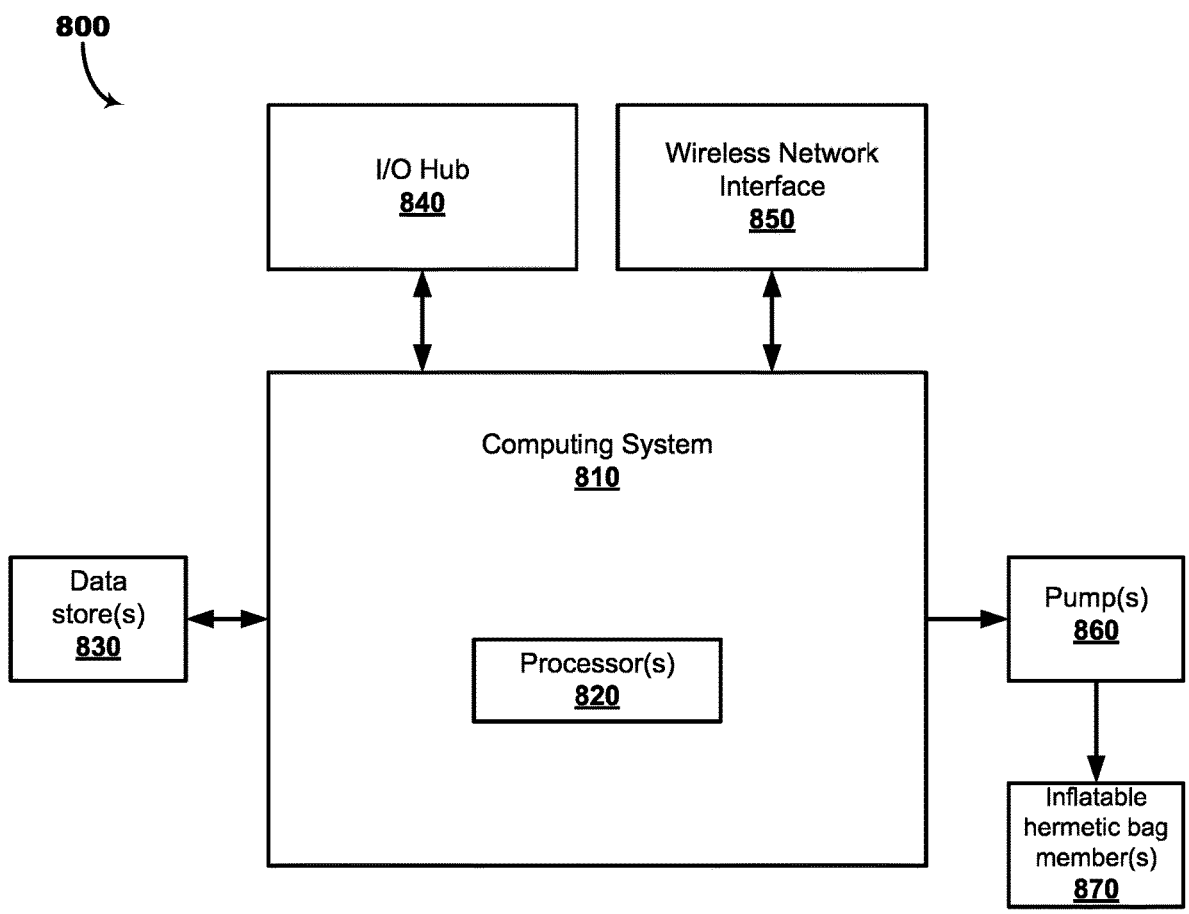
FIG. 8 illustrates an example dynamically deployable cofferdam system, in accordance with one or more embodiments.

As illustrated in FIG. 8, an example dynamically deployable cofferdam system 800 includes a computing system 810 serves as a host, main, or primary control system of the dynamically deployable cofferdam system 800. The computing system 810 may include one or more processors 820. As set forth, described, and/or illustrated herein, "processor" means any component or group of components that are configured to execute any of the processes described herein or any form of instructions to carry out such processes or cause such processes to be performed. The processors 820 may be implemented with one or more general-purpose and/or one or more special-purpose processors. Examples of suitable processors include graphics processors, microprocessors, microcontrollers, DSP processors, and other circuitry that may execute software (e.g., stored on a non-transitory computer-readable medium). Further examples of suitable processors include, but are not limited to, a central processing unit (CPU), an array processor, a vector processor, a digital signal processor (DSP), a field-programmable gate array (FPGA), a programmable logic array (PLA), an application specific integrated circuit (ASIC), programmable logic circuitry, and a controller. The processors 820 may comprise at least one hardware circuit (e.g., an integrated circuit) configured to carry out instructions contained in program code. In embodiments in which there is a plurality of processors 820, such processors 820 may work independently from each other, or one or more processors may work in combination with each other.

An I/O hub 840 may be operatively connected to other systems and subsystems of the dynamically deployable cofferdam system 800. The I/O hub 840 may comprise an input interface and an output interface. The input interface and the output interface may be integrated as a single, unitary interface, or alternatively, be separate as independent interfaces that are operatively connected.

In accordance with one or more embodiments, the input interface may be used by an operator of the dynamically deployable cofferdam system 800 to input one or more data input signals relating to operation of the dynamically deployable cofferdam system 800. The operator may be located on site of the dynamically deployable cofferdam system 800, or located in a location remote from dynamically deployable cofferdam system 800. The input interface is defined herein as any device, component, system, subsystem, element, or arrangement or groups thereof that enable information/data to be entered in a machine. The input interface may receive an input from the operator of the dynamically deployable cofferdam system 800. In an example, the input interface may comprise a user interface (UI), graphical user interface (GUI) such as, for example, a display, human-machine interface (HMI), or the like. Embodiments, however, are not limited thereto, and thus, this disclosure contemplates the input interface comprising any suitable configuration that falls within the spirit and scope of the principles of this disclosure. For example, the input interface may comprise a keypad, toggle switch, touch screen, multi-touch screen, button, joystick, mouse, trackball, microphone and/or combinations thereof.

The output interface is defined herein as any device, component, system, subsystem, element, or arrangement or groups thereof that enable information/data to be presented to the operator of the dynamically deployable cofferdam system 800. The output interface may be configured to present information/data to the vehicle occupant and/or the remote operator. The output interface may comprise one or more of a visual display or an audio display such as a microphone, earphone, and/or speaker. One or more components of the dynamically deployable cofferdam system 800 may serve as both a component of the input interface and a component of the output interface.

One or more data stores 830 are provided for storing one or more types of data. The dynamically deployable cofferdam system 800 may include interfaces that enable one or more systems thereof to manage, retrieve, modify, add, or delete, the data stored in the data stores 30. The data stores 830 may comprise volatile and/or non-volatile memory. Examples of suitable data stores 830 include RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The data stores 830 may be a component of the processors 820, or alternatively, may be operatively connected to the processors 820 for use thereby. As set forth, described, and/or illustrated herein, "operatively connected" may include direct or indirect connections, including connections without direct physical contact.

The computing system 810 may be configured to receive one or more data signals via a wireless network interface 850. The wireless network interface 850 is configured to facilitate wireless communication between the computing system 810 and one or more external source devices. In one or more example embodiments, the computing system 810 may communicate with a wireless PAN (WPAN) (such as, for example, a BLUETOOTH WPAN), a WI-FI network, a WI-MAX network, a cellular telephone network (such as, for example, a Global System for Mobile Communications (GSM) network), or a combination thereof. Embodiments, however, are not limited thereto, and thus, this disclosure contemplates any suitable other suitable wireless network architecture that permits practice of the one or more embodiments.

The wireless network data comprises data communicated to the computing system 810 from sources external to the computing system 810. Such externally sourced data comprises, but is not limited to, one or more of geographic map data, weather data, and crowdsourced traffic data. Accordingly, the computing system 810 is configured to receive information from one or more other external source devices to the and process the received information. Information may be received based on preferences including but not limited to location (e.g., as defined by geography from address, zip code, or GPS coordinates), history, news feeds, and the like. The information (i.e., received or processed information) may also be uplinked to other systems and modules for further processing to discover additional information that may be used to enhance the understanding of the information. The computing system 810 may also send information to other computing systems in a detected weather environment, and link to other devices, including but not limited to smart phones, smart home systems, or Internet-of-Things (IoT) devices.

In accordance with one or more embodiments, operation of the computing system 810 may be implemented as computer readable program code that, when executed by a processors 820, implement one or more of the various processes set forth, described, and/or illustrated herein. The computing system 810 may be a component of the processors 820, or alternatively, may be executed on and/or distributed among other processing systems to which the processors 820 are operatively connected. The computing system 810 may include a set of logic instructions executable by the processors 820. Alternatively or additionally, the data stores 830 may contain such logic instructions. The logic instructions may include assembler instructions, instruction set architecture (ISA) instructions, machine instructions, machine dependent instructions, microcode, state-setting data, configuration data for integrated circuitry, state information that personalizes electronic circuitry and/or other structural components that are native to hardware (e.g., host processor, central processing unit/CPU, microcontroller, etc.).

The computing system 810 may be configured to facilitate, via the wireless network interface 850, dynamic detection of a current weather forecast in the immediate area of the dynamically deployable cofferdam system 800.

In accordance with one or more embodiment, one or more of the computing system 810 and the one or more of the processors 820 are operatively connected to communicate with the one or more pumps 860. For example, the one or more of the processors 820 are in communication to send or transmit one or more command output signals, and/or receive data input signals from the I/O hub 840, and wireless network interface 850 to selectively control the pumps 860 in a manner that controls the dynamically deployable cofferdams.

Additional Notes and Examples

Example 1 provides a dynamically deployable cofferdam system, including a plurality of first planar components forming resilient upper cofferdam members that are moveable between an undeployed position and a deployed position; a plurality of second planar components forming resilient lower cofferdam members; a plurality of inflatable hermetic bag members, defining internal chambers to receive a volume of air, disposed between the upper cofferdam members and the lower cofferdam members; a plurality of connection members to form an attachment between the upper cofferdam members and the lower cofferdam members and facilitate formation of a watertight seal between the inflatable hermetic bag, the upper cofferdam members, and the lower cofferdam members through an application of pressure from the upper cofferdam members and the lower cofferdam members to the inflatable hermetic bag member; and one or more pumps serving as air sources to inflate the inflatable hermetic bag members to a desired pressure, wherein the plurality of connection members facilitate movement of the upper cofferdam members from the undeployed position to the deployed position at a desired height to form a flood mitigation barrier.

Example 2 includes the system of Example 1, wherein the upper cofferdam members have a substantially rectangular cross-section sized to form a seal at an interface with an adjacent one of the upper cofferdam members.

Example 3 includes system of Example 1, wherein the upper cofferdam members have a substantially curvilinear cross-section sized to form a seal at an interface with an adjacent one of the upper cofferdam members.

Example 4 includes the system of Example 1, wherein the lower cofferdam members include one or more anchor members to attach the lower cofferdam members to a base support surface.

Example 5 includes the system of Example 1, wherein the inflatable hermetic bag members have a substantially rectangular cross-section sized to form a seal at an interface with an adjacent one of the inflatable hermetic bag members.

Example 6 includes the system of Example 1, wherein the length of the plurality of connection members is adjustable to apply a desired amount of pressure on the inflatable hermetic bag members and facilitate deployment of the upper cofferdam members to the desired height.

Example 7 includes the system of Example 1, further comprising one or more hinge members attached to the upper cofferdam members and the lower cofferdam members to secure the plurality of connection members.

Example 8 provides a dynamically deployable cofferdam apparatus, including a first planar component forming a resilient upper cofferdam member that is moveable between an undeployed position and a deployed position; a second planar component forming a resilient lower cofferdam member; an inflatable hermetic bag member, defining an internal chamber to receive a volume of air, disposed between the upper cofferdam member and the lower cofferdam member; and a plurality of connection members to form an attachment between the upper cofferdam member and the lower cofferdam member and facilitate formation of a watertight seal between the inflatable hermetic bag, the upper cofferdam members, and the lower cofferdam members through an application of pressure from the upper cofferdam members and the lower cofferdam members to the inflatable hermetic bag member, wherein the plurality of connection members facilitate movement of the upper cofferdam member from the undeployed position to the deployed position at a desired height to form a flood mitigation barrier.

Example 9 includes the apparatus of Example 8, wherein the upper cofferdam member has a substantially rectangular cross-section sized to form a seal at an interface with an adjacent upper cofferdam member.

Example 10 includes the apparatus of Example 8, wherein the upper cofferdam member has a substantially curvilinear cross-section sized to form a seal at an interface with an adjacent upper cofferdam member.

Example 11 includes the apparatus of Example 8, wherein the lower cofferdam member includes one or more anchor members to attach the lower cofferdam members to a base support surface.

Example 12 includes the apparatus of Example 8, wherein the inflatable hermetic bag member has a substantially rectangular cross-section sized to form a seal at an interface with an adjacent inflatable hermetic bag member.

Example 13 includes the apparatus of Example 8, further comprising one or more pumps serving as air sources to inflate the inflatable hermetic bag member to a desired pressure.

Example 14 includes the apparatus of Example 8, wherein the length of the plurality of connection members is adjustable to apply a desired amount of pressure on the inflatable hermetic bag members and facilitate deployment of the upper cofferdam members to the desired height.

Example 15 includes the apparatus of Example 8, further comprising one or more hinge members attached to the upper cofferdam member and the lower cofferdam member to secure the plurality of connection members.

Example 16 provides a method of manufacturing a flood mitigation barrier, the method including arranging an inflatable hermetic bag member, defining an internal chamber to receive a volume of air, between a first planar component forming a resilient upper cofferdam member and a second planar component forming a resilient lower cofferdam member; attaching, via a plurality of connection members, the upper cofferdam member and the lower cofferdam member to facilitate formation of a watertight seal between the inflatable hermetic bag, the upper cofferdam members, and the lower cofferdam members through an application of pressure from the upper cofferdam members and the lower cofferdam members to the inflatable hermetic bag member; and inflating, via one or more pumps as air sources, the inflatable hermetic airbag to a desired pressure such that the upper cofferdam member is moved from an undeployed position to a deployed position at a desired height.

Example 17 includes the method of Example 16, further including attaching the lower cofferdam member to a base support surface.

Example 18 includes the method of Example 17, further comprising, before inflating the inflatable hermetic airbag, detecting a potential flood condition.

Example 19 includes the method of Example 18, wherein the inflatable hermetic airbag is inflated in response to the detection.

Example 20 includes the method of Example 19, further including deflating the inflatable hermetic airbag in response to a detection that the flood condition has subsided in a manner such that the upper cofferdam member is moved from the deployed position to the undeployed position.

Those skilled in the art will appreciate from the foregoing description that the broad techniques of the embodiments can be implemented in a variety of forms. Therefore, while the embodiments have been described in connection with particular examples thereof, the true scope of the embodiments should not be so limited since other modifications will become apparent to the skilled practitioner upon a study of the drawings, specification, and following claims.

What is claimed is:

1. An apparatus, comprising:
an inflatable hermetic bag member disposed between an upper cofferdam member and a lower cofferdam member; and
a resilient connection member forming an attachment between the upper cofferdam member and the lower cofferdam member independently of the inflatable hermetic bag member, the resilient connection member configured for extension in length in tension upon air inflation of the hermetic bag member to facilitate formation of a first watertight seal between the inflatable hermetic bag and the upper cofferdam member at a first contact interface, and a second watertight seal between the inflatable hermetic bag and the lower cofferdam member at a second contact interface.

2. The apparatus of claim 1, wherein the first watertight seal is formed through an application of pressure by the upper cofferdam member on the inflatable hermetic bag member at the first contact interface.

3. The apparatus of claim 1, wherein the second watertight seal is formed through an application of pressure by the lower cofferdam member on the inflatable hermetic bag member at the second contact interface.

4. The apparatus of claim 1, further comprising an air source to inflate the inflatable hermetic bag member to a desired pressure which extends the resilient connection member in length in tension to move the upper cofferdam member from an undeployed position to a deployed position at a desired deployment height which forms a flood mitigation barrier.

5. The apparatus of claim 4, wherein the extension in length of the resilient connection member is configured to apply a desired amount of pressure on the inflatable hermetic bag member and facilitate deployment of the upper cofferdam member to the desired deployment height.

6. The apparatus of claim 1, wherein the lower cofferdam members include an anchor member to attach the lower cofferdam member to a base support surface.

7. The apparatus of claim 1, further comprising a hinge member attached to the upper cofferdam member and the lower cofferdam member to secure the resilient connection member.

8. An apparatus, comprising:
an inflatable hermetic bag member disposed between an upper cofferdam member and a lower cofferdam member; and
a plurality of resilient connection members independent of the inflatable hermetic bag member and forming an attachment between the upper cofferdam member and the lower cofferdam member, the plurality of resilient connection members configured for extension in length in tension upon air inflation of the hermetic bag member to facilitate formation of a watertight seal between the inflatable hermetic bag, the upper cofferdam member, and the lower cofferdam member.

9. The apparatus of claim 8, wherein:
a first watertight seal is formed through an application of pressure by the upper cofferdam member on the inflatable hermetic bag member at a first contact interface, and
a second watertight seal is formed through an application of pressure by the lower cofferdam member on the inflatable hermetic bag member at a second contact interface.

10. The apparatus of claim 8, further comprising an air source to inflate the inflatable hermetic bag member to a desired pressure to extend the plurality of resilient connection members in length in tension to move the upper cofferdam member from an undeployed position to a deployed position at a desired deployment height which forms a flood mitigation barrier.

11. The apparatus of claim 10, wherein the extension in length of the plurality of resilient connection members is configured to apply a desired amount of pressure on the inflatable hermetic bag member and facilitate deployment of the upper cofferdam member to the desired deployment height.

12. The apparatus of claim 8, wherein the lower cofferdam members include an anchor member to attach the lower cofferdam member to a base support surface.

13. The apparatus of claim 8, further comprising a plurality of hinge members attached to the upper cofferdam member and the lower cofferdam member to secure the plurality of resilient connection members.

14. An apparatus, comprising:
- a resilient connection member forming an attachment between an upper cofferdam member and a lower cofferdam member, the resilient connection member configured for extension in length in tension upon air inflation of an inflatable hermetic bag member disposed between the upper cofferdam member and the lower cofferdam member to facilitate formation of a watertight seal between the upper cofferdam member, the lower cofferdam member, and the inflatable hermetic bag member,
- wherein the resilient connection member is connected to at least one of the upper cofferdam member or the lower cofferdam independently of the inflatable hermetic bag member.

15. The apparatus of claim 14, wherein a first watertight seal is formed through an application of pressure by the upper cofferdam member on the inflatable hermetic bag member at a first contact interface.

16. The apparatus of claim 15, wherein a second watertight seal is formed through an application of pressure by the lower cofferdam member on the inflatable hermetic bag member at a second contact interface.

17. The apparatus of claim 16, further comprising an air source to inflate the inflatable hermetic bag member to a desired pressure which extends the resilient connection member in length in tension to move the upper cofferdam member from an undeployed position to a deployed position at a desired deployment height which forms a flood mitigation barrier.

18. The apparatus of claim 17, wherein the extension in length of the resilient connection member is configured to apply a desired amount of pressure on the inflatable hermetic bag member and facilitate deployment of the upper cofferdam member to the desired deployment height.

19. The apparatus of claim 14, wherein the lower cofferdam members include an anchor member to attach the lower cofferdam member to a base support surface.

20. The apparatus of claim 14, further comprising a hinge member attached to the upper cofferdam member and the lower cofferdam member to secure the resilient connection member.

* * * * *